US008826762B2

(12) United States Patent
Matsuda et al.

(10) Patent No.: US 8,826,762 B2
(45) Date of Patent: Sep. 9, 2014

(54) TRANSMISSION DEVICE FOR TWO-WHEELED MOTOR VEHICLE

(75) Inventors: Yoshimoto Matsuda, Kobe (JP); Takahiro Nitta, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 152 days.

(21) Appl. No.: 13/512,613

(22) PCT Filed: Nov. 30, 2010

(86) PCT No.: PCT/JP2010/071347
§ 371 (c)(1),
(2), (4) Date: May 30, 2012

(87) PCT Pub. No.: WO2011/065562
PCT Pub. Date: Jun. 3, 2011

(65) Prior Publication Data
US 2012/0240701 A1    Sep. 27, 2012

(30) Foreign Application Priority Data

Nov. 30, 2009    (JP) ............................... P2009-271301
Nov. 5, 2010     (WO) .................. PCT/JP2010/006517

(51) Int. Cl.
F16H 3/22       (2006.01)
F16D 11/14      (2006.01)
F16D 11/00      (2006.01)
F16H 63/30      (2006.01)

(52) U.S. Cl.
CPC .......... *F16D 11/14* (2013.01); *F16D 2011/004* (2013.01); *F16H 2063/3093* (2013.01)
USPC .............................................. 74/340; 74/333

(58) Field of Classification Search
USPC .................... 74/331, 333, 339, 340
See application file for complete search history.

(56) References Cited

U.S. PATENT DOCUMENTS 3,550,738 A * 12/1970 Halibrand .................... 192/53.5
4,427,088 A    1/1984  Tsuboi
(Continued)

FOREIGN PATENT DOCUMENTS

JP    57-168734    4/1956
JP    45-27134     10/1970
(Continued)

OTHER PUBLICATIONS

International Search Report issued Jan. 25, 2011 in International (PCT) Application No. PCT/JP2010/071347.
(Continued)

*Primary Examiner* — Ha D Ho
(74) *Attorney, Agent, or Firm* — Wenderoth, Lind & Ponack, L.L.P.

(57) ABSTRACT

A transmission for a motorcycle has an input shaft, an output shaft, a plurality of speed change input gears, and a plurality of speed change output gears, and performs shifting by a shift mechanism. The speed change input gears are fixed to one of the input shaft and the output shaft, e.g., the input shaft, in the axial direction and about the axis, the speed change output gears are fixed to the output shaft in the axial direction and are fitted to be rotatable about the axis, and a plurality of slider rings for dog-coupling are fixed to the other shaft about the axis and are provided to be slidable in the axial direction. An engaging hole is formed in the slider rings, and the speed change gears on the other shaft are formed with an engaging projection which can engage with the engaging hole by the movement of the slider rings in the axial direction.

20 Claims, 12 Drawing Sheets

(56) References Cited

U.S. PATENT DOCUMENTS

| | | | |
|---|---|---|---|
| 5,501,292 A * | 3/1996 | Kawashima et al. | 180/220 |
| 6,019,010 A | 2/2000 | Trinder | |
| 6,276,481 B1 * | 8/2001 | Matsuto et al. | 180/220 |
| 6,354,417 B1 | 3/2002 | Narita et al. | |
| 6,357,545 B1 * | 3/2002 | Hori et al. | 180/219 |
| 6,595,078 B2 * | 7/2003 | Arakawa | 74/337.5 |
| 7,735,616 B2 * | 6/2010 | Nagahashi et al. | 192/69.8 |
| 2009/0229394 A1 | 9/2009 | Takahara et al. | |

FOREIGN PATENT DOCUMENTS

| | | |
|---|---|---|
| JP | 52-8742 | 1/1977 |
| JP | 63-88350 | 4/1988 |
| JP | 2000-503100 | 3/2000 |
| JP | 2001-74061 | 3/2001 |
| JP | 2003-148615 | 5/2003 |
| JP | 2007-9737 | 1/2007 |
| JP | 2009-216223 | 9/2009 |

OTHER PUBLICATIONS

Japanese Office Action (OA) issued May 7, 2014 in corresponding Japanese Patent Application No. 2013-185385.

* cited by examiner

TRANSMISSION DEVICE FOR TWO-WHEELED MOTOR VEHICLE

TECHNICAL FIELD

The present invention relates to a transmission for motorcycle, more specifically, to a gear transmission.

BACKGROUND ART

FIG. 14 shows a conventional example of a gear six-speed transmission for a motorcycle. An input shaft 201 for shifting and an output shaft 202 for shifting are provided in parallel with each other in a transmission case (not shown). The input shaft 201 has a speed change input gear group. The speed change input gear group includes first-speed to sixth-speed input gears 211, 212, 213, 214, 215 and 216. The input shaft 201 is coupled to a crankshaft (not shown) via a clutch 219 so as to be capable of transmitting power. The output shaft 202 for shifting has a speed change output gear group. The speed change output gear group includes output gears 221, 222, 223, 224, 225 and 226 which engage with the input gears 211, 212, 213, 214, 215, and 216 at all times.

In the conventional example, the first-speed input and output gears 211 and 221, the fourth-speed input and output gears 214 and 224, the third-speed input and output gears 213 and 223, the fifth-speed input and output gears 215 and 225, the sixth-speed input and output gears 216 and 226, and the second-speed input and output gears 212 and 222 are arranged in this order from the clutch 219 side.

A shift mechanism will be described. Regarding the input shaft 5, the third-speed input gear 213 and the fifth-speed input gear 215 are arranged at the center of the input shaft 201 in the axial direction. The third-speed input gear 213 and the fifth-speed input gear 215 are integrally formed on each other and spline-fitted on the input shaft 201 so as to be movable in the axial direction. The remaining first-speed, fourth-speed, sixth-speed and second-speed input gears 211, 214, 216, and 212 are fixed to the input shaft 201 so as not to be movable in the axial direction. Then, a dog teeth clutch mechanism 231 is provided between the fourth-speed input gear 214 and the third-speed input gear 213, and a dog teeth clutch mechanism 232 is provided between the fifth-speed input gear 215 and the sixth-speed input gear 216.

On the other hand, regarding the output shaft 202, the fourth-speed output gear 224 and the sixth-speed output gear 226 are spline-fitted on the output shaft 202 for shifting so as to be independently movable in the axial direction. The remaining first-speed, third-speed, fifth-speed and second-speed output gears 221, 223, 225, and 222 are fixed to the output shaft 202 so as not to be movable in the axial direction. Then, a dog teeth clutch mechanism 233 is provided between the fourth-speed output gear 224 and the first-speed output gear 221, and a dog teeth clutch mechanism 234 is provided between the sixth-speed output gear 226 and the second-speed output gear 222.

Although not shown, the shift operation mechanism including a shift cam drum and shift forks movably operates the third-speed input gear 213 and the fifth-speed input gear 215, the fourth-speed output gear 224, and the sixth-speed output gear 226 in the axial direction. This moving operation selectively engages the dog teeth clutch mechanisms 231, 232, 233 and 234 with the gears, thereby shifting to the desired shifting stage. The above configuration is disclosed in Patent Document.

PRIOR ART DOCUMENT

Patent Document

Patent Document 1: Japanese Patent Application Laid-Open (JP-A) No. 2007-009737 (FIG. 4)

By the way, race or sports type motorcycles can have seven speeds or eight speeds or more. However, in the above shifting configuration in which the dog clutch teeth are formed on the speed change gears themselves to move the gears themselves in the axial direction, there is the following problem. When the number of gears on the input shaft 201 and the output shaft 202 is increased to increase the number of shifting stages, the shaft length of both the shafts 201 and 202 becomes longer, with the result that the width in the axial direction of the transmission case, that is, the width in the vehicle width direction, becomes larger, thereby limiting a space for the legs of the rider. In addition, the shaft length of the input shaft 201 and the output shaft 202 becomes longer, with the result that shaft bending becomes greater to deteriorate the shift feeling and reduce the power transmission efficiency between the gears.

Also, when the speed change gears themselves are moved, the gears themselves incline. Therefore, contact of the gear teeth ends becomes poor, with the result that pitting can occur.

Further, in a motorcycle having a larger reduction gear ratio than a four-wheel vehicle, the diameter of the speed change output gears is extremely larger than the diameter of the speed change input gears. Therefore, it is desired that the dog tooth and engaging holes which engage the dog tooth are efficiently provided in the radial direction, and it is desired that a structure of the gear transmission can withstand any transmission torque and any impact at the time of shifting.

SUMMARY OF THE INVENTION

An object of the present invention is to provide a transmission for a motorcycle which can solve the above problems by maintaining compactability in the vehicle width direction and in the radial direction. Another object of the present invention is to provide a motorcycle which can meet the above request.

The present invention provides a transmission for a motorcycle which has an input shaft, an output shaft arranged in parallel with the input shaft, a plurality of speed change input gears provided on the input shaft, and a plurality of speed change output gears which are provided on the output shaft and engage with the speed change input gears, respectively, and selects a power transmission path via the speed change input gears and the speed change output gears between the input shaft and the output shaft for shifting. The plurality of speed change input or output gears provided on one of the input shaft and the output shaft are fixed to the one shaft in the axial direction and about the axis, and the plurality of speed change input or output gears provided on the other shaft are fixed to the other shaft in the axial direction and are fitted to be rotatable about the axis. A plurality of slider rings for dog-coupling are fixed to the other shaft about the axis and are provided to be slidable in the axial direction, and engaging holes are formed in each of the slider rings. Each of the speed change input or output gears provided on the other shaft is formed with engaging projections which can engage with the engaging holes by the movement of the slider ring in the axial direction.

In the present invention, the following configurations can be preferably adopted.

(a) The plurality of speed change output gears and the plurality of speed change input gears are disposed so that the shifting stage is sequentially higher from one end toward the other end in the axial direction.

(b) A plurality of slide grooves which extend in the axial direction are formed in the inner circumferential surface of the slider ring, and a sliding projection which engages with each of the slide grooves in the slider ring is formed on the other shaft or a cylindrical member fixed to the other shaft about the axis and in the axial direction. The slide groove is arranged in a position displaced from the engaging hole in the circumferential direction, and an outward end in the radial direction of the slide groove projects outward in the radial direction from an inward end in the radial direction of the engaging hole.

(c) At least the length in the circumferential direction of the engaging hole in the slider ring for the lowest speed stage is formed to be shorter than the length in the circumferential direction of the engaging hole in the slider ring for the highest speed stage.

(d) The end face in the axial direction of the slider ring is formed with a projecting surface for a stopper which projects stepwise in the axial direction in the range from near the inward end in the radial direction of the engaging hole to near the outward end in the radial direction thereof.

(e) A nitrided layer is formed on the surface of the slider ring.

(f) The slider ring is coupled to a shift cam drum (selector cam drum) so as to be moved in the axial direction via a shift member (selector member), and the shift cam drum is arranged below the other shaft so that a lubricating oil dropped from the other shaft is supplied to the shift cam drum.

(g) The slider ring is coupled to a shift cam drum so as to be moved in the axial direction via a shift member, and the shift cam drum is arranged above the other shaft so that lubricating oil dropped from the shift cam drum is supplied to the speed change gear on the other shaft.

(h) The other shaft on which all the slider rings are arranged is the output shaft.

(i) Three shift members are provided, the three shift members being formed in the same shape.

(j) A transmission for a electrically-powered motorcycle has an electric motor in the motorcycle, power from the electric motor being inputted to the input shaft.

EFFECTS OF THE INVENTION

According to the present invention, the following effects can be obtained.

(1) Only the slider rings for shift mechanism are provided on the input shaft and the output shaft so as to be movable in the axial direction, and all the speed change output gears and input gears are fixed in the axial direction. Therefore, even when the shifting operation is performed, the speed change gears themselves cannot incline, so that contact of the gear teeth ends is maintained good, there being no fear of causing pitting.

(2) Since all the speed change input gears on the input shaft and the speed change output gears on the output shaft are fixed in the axial direction, the shaft length of the input shaft and the output shaft can be held short. With this, the shaft diameter and the weight of the input shaft and the output shaft can be smaller, so that shaft bending due to the load during the driving can be reduced, thereby making the shift feeling smooth.

(3) The engaging holes are formed in the slider ring, and the engaging projections which engage with the engaging holes are formed on the speed change gear. At the time of engagement, the slider ring can receive a driving load, not only by a shearing force, but also a compressive force in the circumference direction, so that the thickness of the slider rings can be smaller, thereby capable of holding the length in the axial direction of the input shaft and the output shaft short.

(4) The slider rings for shift mechanism are provided only on one of the input shaft and the output shaft. When e.g., the shift cam drum and the shift forks are used as the shift mechanism, the shift mechanism can require only one shift shaft for supporting the shift forks. Therefore, the shift cam drum and the shift forks can be compactly assembled in a space near the one shaft. In addition, when an electromagnetic or hydraulic type mechanism is used as the shift mechanism, those mechanisms can be compactly assembled on the one shaft and therenear.

(5) No gear teeth are formed on the outer circumferential surfaces of the slider rings which are slid in the axial direction, so that the slider rings can be reduced in outer diameter and weight, as compared with the conventional example of FIG. 14 in which the dog teeth are formed on the side end faces of the speed change gears to slide the speed change gears themselves in the axial direction.

(6) All the speed change gears are retained so as not to be movable in the axial direction, so that helical gears which exert a thrust force can be adopted as the speed change gears, and any noise can be reduced, as compared with when spur gears are used.

(7) According to the configuration (a), the speed change output gears and the speed change input gears are disposed so that the shifting stage is sequentially higher from one end toward the other end in the axial direction, so that the assembling order of the speed change gears cannot be mistaken at the time of assembling, thereby improving the efficiency of the assembling operation.

(8) In addition, according to the configuration (a), the speed change gears which are close in diameter are adjacent to each other to arrange each of the slider rings between the speed change gears which are close in diameter, so that the position in the radial direction of the engaging hole in the slider ring and the position in the radial direction of the engaging projection on both the speed change gears are easily matched to make the manufacturing easy.

(9) According to the configuration (b), even when the slider ring is formed with the engaging hole and the slide groove in the inner circumferential surface thereof, the slider ring can be short in the radial direction, so that the slider ring can be reduced in size and weight.

(10) Regarding the engaging chance of the engaging hole and the engaging projection, at the high speed stage, the speed change output gear is rotated at high speed, so that the engaging chance becomes shorter. In that case, according to the configuration (c), the length in the circumference direction of the engaging hole at the high speed stage is made longer, so that the engaging chance at the time of shifting at the high speed stage can be longer. With this, the engaging hole and the engaging projection can be smoothly brought into the desired engaged state. On the other hand, the length in the circumferential direction of the engaging hole at the low speed stage becomes shorter. In that case, the speed change output gear is rotated at low speed, so that the engaging hole and the engaging projection can be smoothly brought into the engaged state, and the width in the circumferential direction of a wall between the adjacent engaging holes becomes longer, thereby obtaining strength suitable for high torque. Further, when the engaging hole in the speed change output gear for low speed stage is short, a distance in which the engaging projection fitted into the engaging hole is moved so as to be abutted onto the edge in the circumference direction of the engaging hole becomes short, so that any impact when the engaging projection is abutted onto the edge in the circumference direction of the engaging hole can be smaller.

(11) According to the configuration (d), the projecting surface for stopper which projects stepwise in the axial direction is formed throughout the circumference of the engaging hole in the slider ring. Therefore, when the engaging projection on the speed change gear is fitted into the engaging hole in the slider ring, a shoulder contact phenomenon (a partial contact phenomenon) due to the excessive movement of the speed change gear can be prevented. The end surface of the change gear is abutted onto the projecting surface throughout the circumference of the engaging hole to ensure good power transmission for preventing any noise due to the shoulder contact phenomenon.

(12) According to the configuration (e), the nitrided layer is formed on the surface of the slider ring, so that the durability with respect to an impact can be improved, as compared with a carburizing process in which the hardness is increased to the inside thereof.

(13) According to the configuration (f), the lubricating oil supplied to the output shaft or the input shaft can be automatically used for lubricating the shift cam drum, so that the lubricating oil can be effectively used.

(14) According to the configuration (g), contrary to the configuration (f), the lubricating oil supplied to the shift cam drum can be automatically used for lubricating the output shaft or the input shaft, so that the lubricating oil can be effectively used.

(15) In the motorcycle, as compared with a four-wheel vehicle, to reduce the speed of the engine rotated at high speed, the shifting ratio between the speed change input gears and the speed change output gears becomes larger, so that the diameter of the speed change output gears becomes larger. In such a transmission for a motorcycle, according to the configuration (h), all the slider rings are arranged on the output shaft, so that the forming of the engaging projection which can engage with the engaging hole in the slider ring is advantageous in strength or processing as compared with when all the slider rings are formed on the speed change input gears having a small diameter.

(16) According to the configuration (i), the three shift members in the same shape are used, so that the productivity of the shift members can be improved to make the parts management easy.

(17) According to the configuration (j), the electric motor is provided, and the power of the electric motor is inputted to the input shaft, so that the gear transmission can be prevented from being increased in the vehicle width direction.

DETAILED DESCRIPTION OF THE INVENTION

First Embodiment

Figure 1:
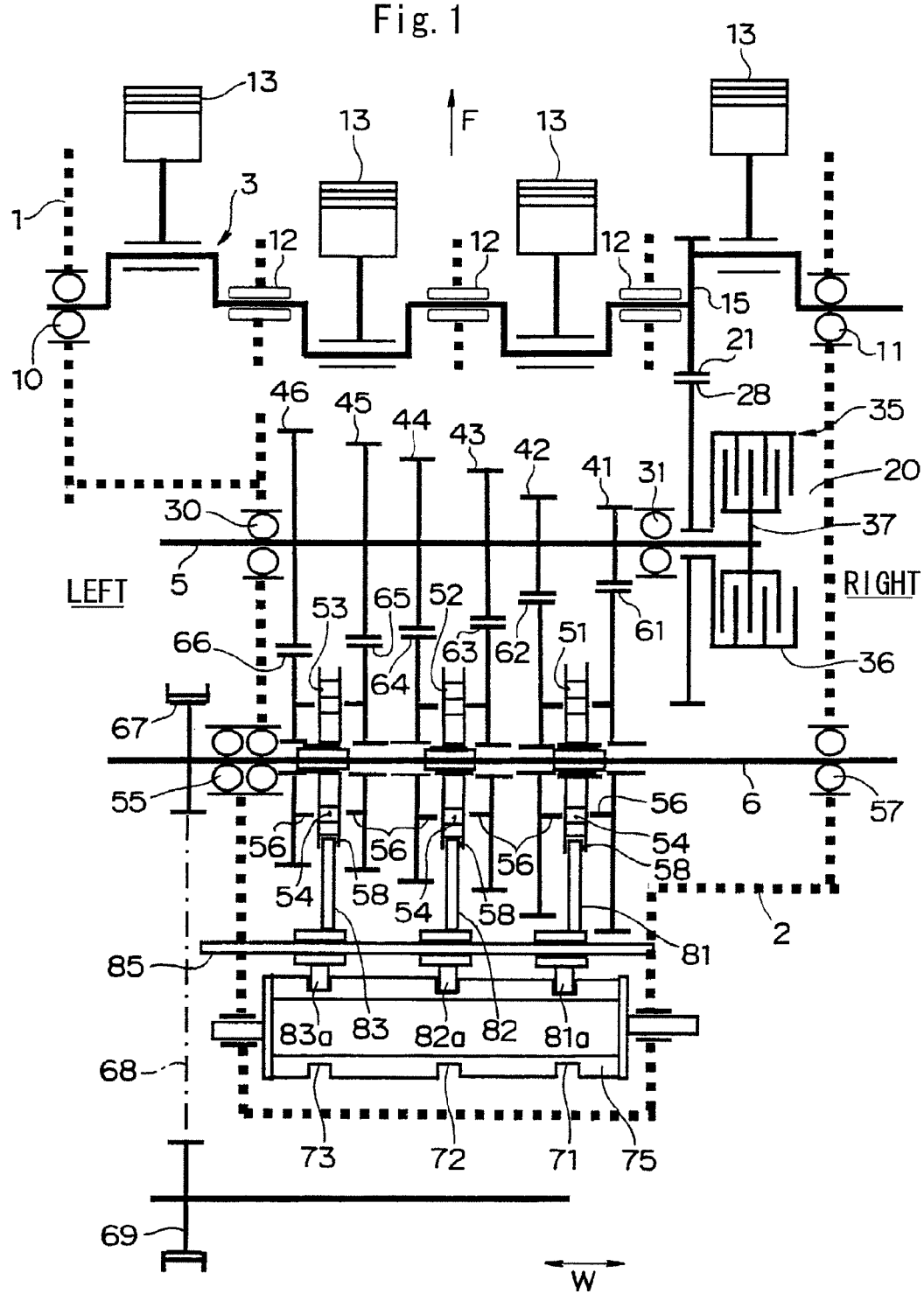
FIG. 1 is a schematic cross-sectional view in a neutral state in which a transmission for motorcycle according to a first embodiment of the present invention and an engine are taken on a plane passing through each shaft.

FIGS. 1 to 8 show a gear transmission for a motorcycle according to a first embodiment of the present invention, and the first embodiment will be described based on these drawings. In the drawings, the vehicle width direction of the motorcycle is indicated by an arrow W, and the front of the vehicle (moving direction) is indicated by an arrow F. In addition, the left-right direction seen from the rider is indicated as the left-right direction of the vehicle.

In FIG. 1, an engine E is a four-cylinder engine, and a transmission case 2 is integrally provided on the rear side of a crankcase 1. A crankshaft 3 which extends in the vehicle width direction W is arranged in the crankcase 1. In the transmission case 2, an input shaft 5 for shifting and an output shaft 6 for shifting are arranged in parallel with the crankshaft 3. The output shaft 6 is arranged rearward of the input shaft 5.

The crankshaft 3 is rotatably supported in the crankcase 1 via a left bearing 10, a right bearing 11 and a plurality of journal bearings 12 in the intermediate portion of the crankshaft 3 in the axial direction. Crankpins in the crankcase 1 are coupled to pistons 13 of the corresponding cylinders via connecting rods, respectively. A crank gear 21 is integrally formed on the outer circumferential surface of the second crank web 15 from the right side of the crankshaft 3.

The left and right ends of the input shaft 5 are rotatably supported in the transmission case 2 by bearings 30 and 31. A first-speed input gear 41, a second-speed input gear 42, a third-speed input gear 43, a fourth-speed input gear 44, a fifth-speed input gear 45 and a sixth-speed input gear 46 are fixed onto the input shaft 5 in this order from the right side so as not to be movable in the axial direction.

The right end of the input shaft 5 projects in a clutch chamber 20. A multiple-disc friction clutch 35 is mounted on the right projected portion of the input shaft 5, and a clutch gear 28 is idlably fitted on the right projected portion of the input shaft 5. The clutch gear 28 engages with the crank gear 21, and is coupled to an outer case (clutch housing) 36 on the input side of the clutch 35. An inner hub 37 on the output side of the clutch 35 is fixed to the input shaft 5. As is well known, the outer case 36 and the inner hub 37 are disconnectably connected via a large number of friction plates.

Figure 2:
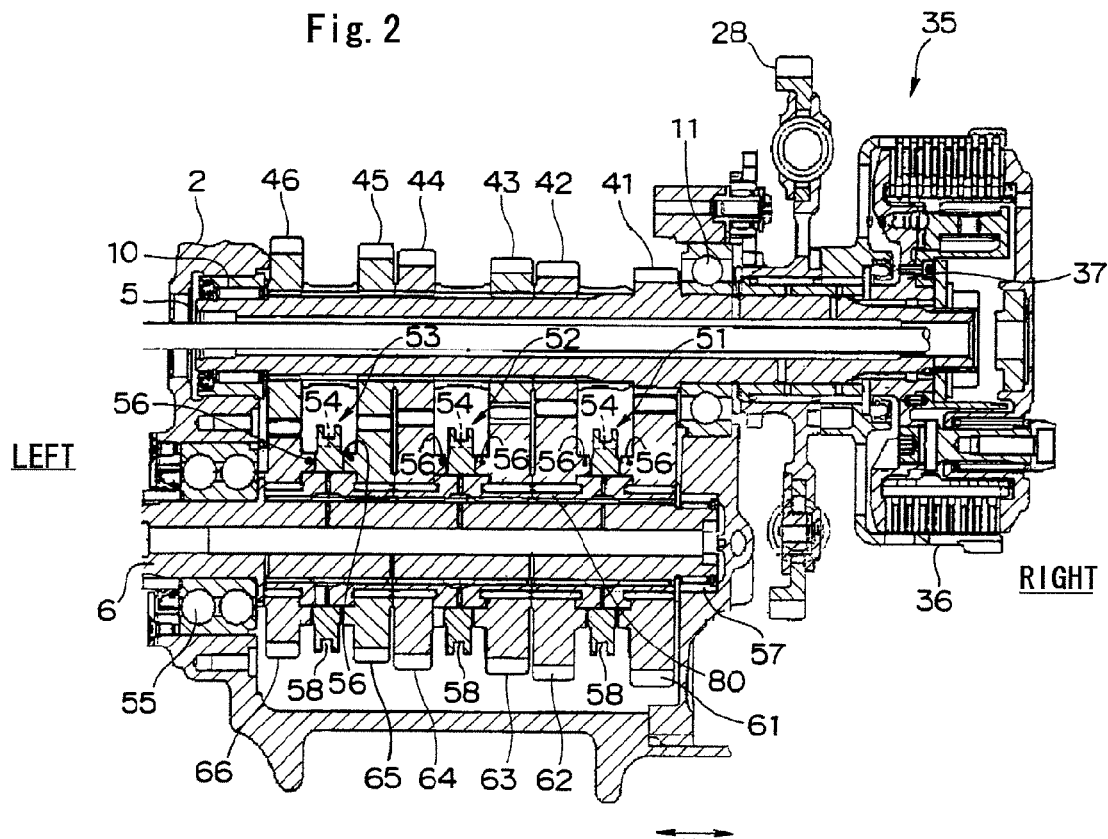
FIG. 2 is an enlarged sectional view of the transmission for motorcycle of FIG. 1.
Figure 2:
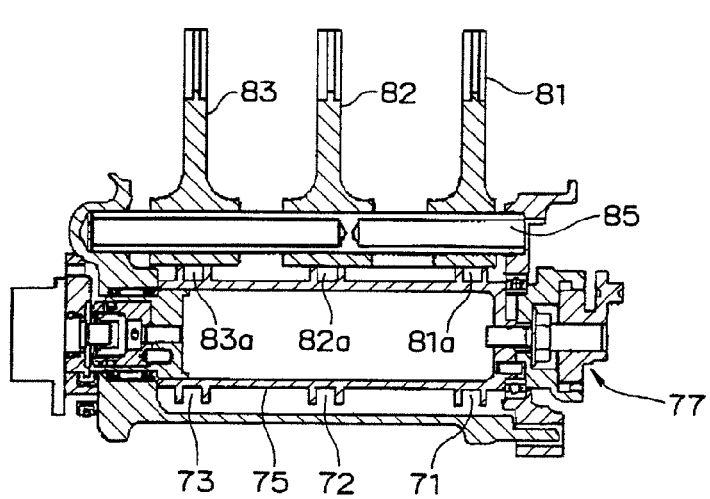

In FIG. 2 showing the detail of the transmission of FIG. 1, the left and right ends of the output shaft 6 are rotatably supported in the transmission case 2 by bearings 55 and 57.

An intermediate cylindrical shaft 80 is fixed to the outer circumference of the output shaft 6. A first-speed output gear 61, a second-speed output gear 62, a third-speed output gear 63, a fourth-speed output gear 64, a fifth-speed output gear 65 and a sixth-speed output gear 66 are idlably fitted onto the outer circumference of the intermediate cylindrical shaft 80 in this order from the right side. The first-speed output gear 61, the second-speed output gear 62, the third-speed output gear 63, the fourth-speed output gear 64, the fifth-speed output gear 65 and the sixth-speed output gear 66 engage with the first-speed input gear 41, the second-speed input gear 42, the third-speed input gear 43, the fourth-speed input gear 44, the fifth-speed input gear 45 and the sixth-speed input gear 46 at all times, respectively.

As shown in FIG. 1, the left end of the output shaft 6 projects to the outside of the transmission case 2. An output sprocket 67 is fixed to the left projected end of the output shaft 6. The output sprocket 67 is coupled to a sprocket 69 of the rear wheel via a driving chain 68.

A first slider ring 51 for shift mechanism is spline-fitted on the output shaft 6 between the first-speed output 61 and the second-speed output gear 62 so as to be movable in the axial direction. A second slider ring 52 is spline-fitted on the output shaft 6 between the third-speed output gear 63 and the fourth-speed output gear 64 so as to be movable in the axial direction. A third slider ring 53 is spline-fitted on the output shaft 6 between the fifth-speed output gear 65 and the sixth-speed output gear 66 so as to be movable in the axial direction. Each of the first slider ring 51, the second slider ring 52 and the third slider ring 53 has a plurality of engaging holes 54 with spacing in the circumference direction. In addition, specifically, the first slider ring 51, the second slider ring 52 and the third slider ring 53 are spline-fitted on the outer circumference surface of the intermediate cylindrical shaft 80 so as to be movable in the axial direction. In other words, the intermediate cylindrical shaft 80 serves as a slider rail which slidably supports the slider rings 51, 52, and 53 in the axial direction.

On the other hand, engaging projections 56 which project toward each of the slider rings 51, 52 and 53 to engage with the engaging holes 54 are formed on the end face in the axial direction of each of the output gears 61, 62, 63, 64, 65 and 66.

An operation mechanism for operating the slider rings 51, 52 and 53 in the axial direction has a shift cam drum 75, a first shift fork 81, a second shift fork 82, a third shift fork 83 and a shift shaft 85. The shift cam drum 75 has three cam grooves 71, 72 and 73. The first shift fork 81, the second shift fork 82 and the third shift fork 83 have driving pins to engage with the cam grooves 71, 72 and 73, respectively. The shift shaft 85 supports the shift forks 81, 82 and 83 so that they are movable in the axial direction. The shift cam drum 75 and the shift shaft 85 are arranged in parallel with the output shaft 6 and the input shaft 5 and below both the shafts 5 and 6. The fork claws of the shift forks 81, 82 and 83 engage with annular grooves 58 formed on the outer circumferences of the slider rings 51, 52 and 53, respectively. All the three shift forks 81, 82 and 83 have the same shape.

In FIG. 2, the shift cam drum 75 is interlockably coupled to a change pedal (not shown) via a swingable change arm mechanism 77 and a change shaft (not shown) like the typical drum operation mechanism of the motorcycle. In other words, by the pedaling operation (push down operation) or the pull up operation of the change pedal, the shift cam drum 75 is rotated by a predetermined rotation amount via the change arm mechanism 77. By the rotation of the shift cam drum 75, the shift forks 81, 82, and 83 are moved in the axial direction via the cam grooves 71, 72 and 73, thereby selectively moving the slider rings 51, 52 and 53 in the axial direction.

Figure 3:
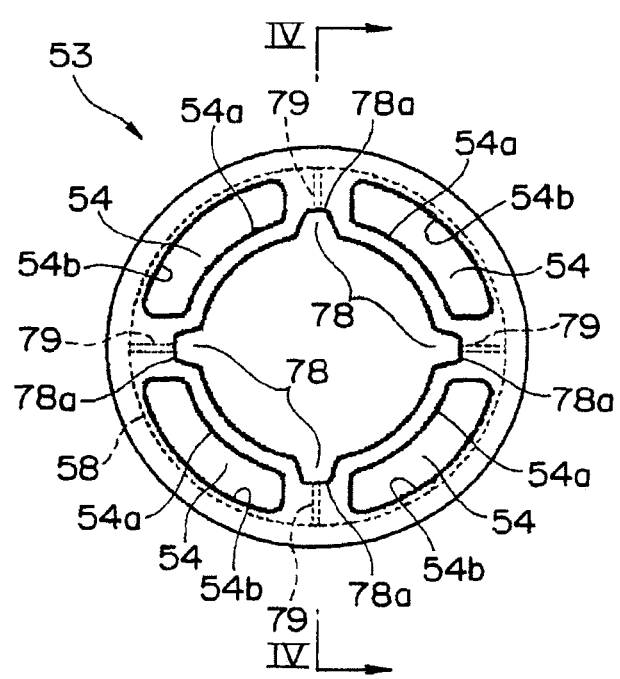
FIG. 3 is a front enlarged view (a view seen in the axial direction) of a slider ring for high speed stage.

FIG. 3 is a front view of the third slider ring 53 for high speed stage. Four engaging holes 54 are formed with equal spacing in the circumference direction. Four slide grooves (spline grooves) 78 are formed with equal spacing in the circumferential direction on the inner circumferential surface of the third slider ring 53. Each of the slide grooves 78 is formed in a wall portion between the adjacent engaging holes 54 in the circumference direction in a position displaced from the engaging hole 54 in the circumference direction. A groove bottom (the outward end in the radial direction) 78a of the slide groove 78 is located outward in the radial direction from an inward end 54a in the radial direction of the engaging hole 54. In other words, in the wall between the engaging holes 54, the slide groove 78 is formed to project outward in the radial direction from the inward end 54a of the engaging hole 54. In addition, a lubricating oil passage 79 which extends outward in the radial direction to the groove bottom of the cam groove 58 is formed in the groove bottom 78a of the slide groove 78.

Figure 4:
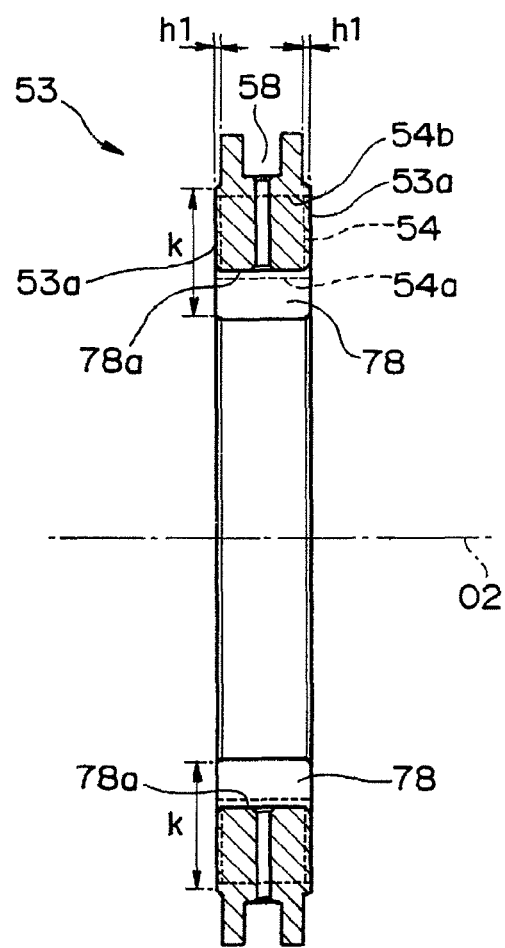
FIG. 4 is an enlarged sectional view taken on line IV-IV of FIG. 3.

FIG. 4 is an enlarged sectional view taken on line IV-IV of FIG. 3, a planar projecting surface 53a is formed on each end face in the axial direction of the third slider ring 53. The projecting surface 53a projects outward in the axial direction from the end face by a predetermined projection amount h1. A forming range K in the radial direction of the projecting surface 53a extends from the inward side portion in the radial direction from the inward end 54a of the engaging hole 54, to the outward side portion in the radial direction from an outward end 54b of the engaging hole 54, and is formed throughout the circumference in the circumference direction. The projection amount h1 is set to e.g., about 0.5 to 1.0 mm.

The third slider ring 53 is manufactured of nitriding steel. An example of the manufacturing process will be described. First, shaping is performed by machining, followed by polishing and nitriding, and then, a surface compound such as nitriding iron caused by the nitriding is polished and removed. The nitriding is performed on the inside having a depth of about 0.1 mm from the surface, but by the polishing after the nitriding, the surface compound layer (nitriding iron layer) of about 8 microns is shaved away. The reason why the surface compound layer is shaved away is that the surface compound is integrated with the inside to be easily broken and can be peeled off by an impact at the time of shifting. Further, as the polishing after the surface processing, there is shot peeling which sprays high pressure gas.

Figure 5:
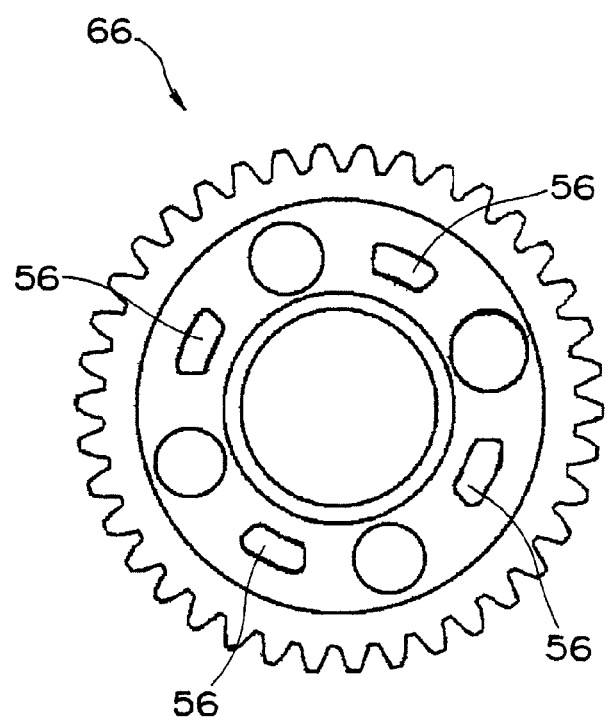
FIG. 5 is a front view of a sixth-speed output gear which is one of speed change output gears.

FIG. 5 is a front view of the sixth-speed output gear 66, and four engaging projections 56 are formed with equal spacing in the circumference direction on the end face in the axial direction of the sixth-speed output gear 66.

In FIG. 5, the detailed configuration of the sixth-speed output gear 66 has been described. As with the sixth-speed output gear 66, four engaging projections 56 are formed on the first-speed output gear 61, the second-speed output gear 62, the third-speed output gear 63, the fourth-speed output gear 64 and the fifth-speed output gear 65 except that their outer diameters are set based on the respective reduction gear ratios.

In addition, in FIGS. 3 and 4, only the detailed configuration of the third slider ring 53 has been described. As shown in FIG. 8, as with the third slider ring 53, each of the first slider ring 51 for the low speed stage and the second slider ring 52 for the middle speed stage has four engaging projections 54 with equal spacing in the circumferential direction and has the slide grooves 78 between the engaging holes 54 in the circumferential direction. In addition, projecting surfaces 51a and 52a (however, 52a is not shown) which project outwardly in the axial direction by a predetermined amount are formed on the end faces in the axial direction of the first slider ring 51 and the second slider ring 52, respectively. Further, a length L1 in the circumferential direction of the first slider ring 51 and the second slider ring 52 is formed to be shorter than a length L3 in the circumferential direction of the third slider ring 53 shown in FIG. 7.

Figure 7:
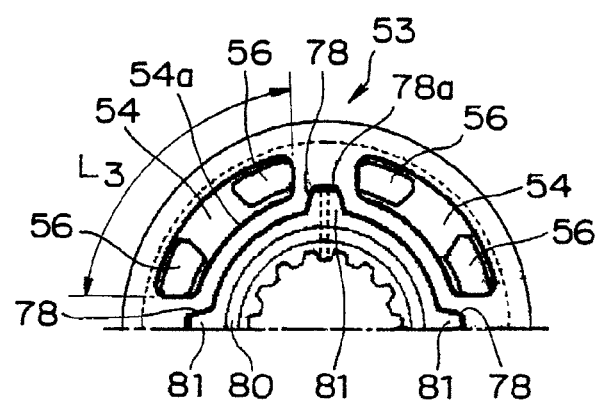
FIG. 7 is a front view showing the engaged state of an engaging hole in the slider ring for high speed stage and an engaging projection on the sixth-speed output gear.
Figure 8:
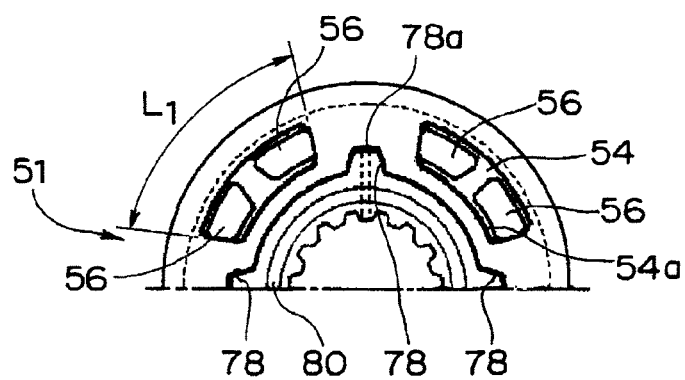
FIG. 8 is a front view showing the engaged state of an engaging hole in a slider ring for low speed stage and an engaging projection on a first-speed output gear.

For instance, in FIG. 7, the engaging projection 56 on the sixth-speed output gear 66 in the engaging hole 54 in the third slider ring 53 is movable in the crank angle range of 41° at the maximum. On the contrary, in FIG. 8, the engaging projection 56 on the first-speed output gear 61 in the engaging hole 54 in the first slider ring 51 is shorter than that of the sixth-speed output gear 66 and is movable in the crank angle range of about 31° at the maximum.

In addition, like the third slider ring 53, the nitrided layer is formed on the surface of the first slider ring 51 and the second slider ring 52.

Further, in this embodiment, the second slider ring 52 has the same size as the first slider ring 51.

The Operation of the Embodiment

In the state in FIGS. 1 and 2, the first slider ring 51, the second slider ring 52 and the third slider ring 53 are all in the neutral position. When the clutch 35 is disconnected and then the change pedal is pushed down from the neutral state of FIGS. 1 and 2, the shift cam drum 75 is rotated by a predetermined rotation amount. When the shift cam drum 75 is rotated, the first shift fork 81 is moved to the right side by the first cam groove 71, the engaging hole 54 in the first slider ring 51 engages with the engaging projection 56 on the first-speed output gear 61, so that the first-speed output gear 61 and the output shaft 6 are coupled so as to be capable of transmitting power.

When the clutch 35 is connected in the first-speed state, the rotating power of the crankshaft 3 is transmitted to the input shaft 5 via the crank gear 21, the clutch gear 28, the outer case 36 of the clutch 35, the friction plate and the inner hub 37. The power from the input shaft 5 is transmitted to the output shaft 6 via the first-speed input gear 41, the first-speed output gear 61, the engaging projection 56 on the first-speed output gear 61, the engaging hole 54 in the first slider ring 51, the first slider ring 51 and the intermediate cylindrical shaft 80 (FIG. 2). The power from the output shaft 6 is transmitted to the rear wheel via the output sprocket 67, the driving chain 68 and the sprocket 69.

At the time of changing the shifting stage from the first speed to the second speed, the shift cam drum 75 is rotated by a predetermined amount by operating the change pedal to move the first slider ring 51 to the left side, so that the engaging hole 54 in the first slider ring 51 engages with the engaging projection 56 on the second-speed output gear 62.

At the time of changing the shifting stage to the third speed or the fourth speed, the shift cam drum 75 is rotated by a predetermined amount, so that the second slider ring 52 is moved to the right side (for third speed) or to the left side (for fourth speed).

At the time of changing the shifting stage to the fifth speed and the sixth speed, the shift cam drum 75 is rotated by a predetermined amount, so that the third slider ring 53 is moved to the right side (for fifth speed) or to the left side (for sixth speed).

Figure 6:
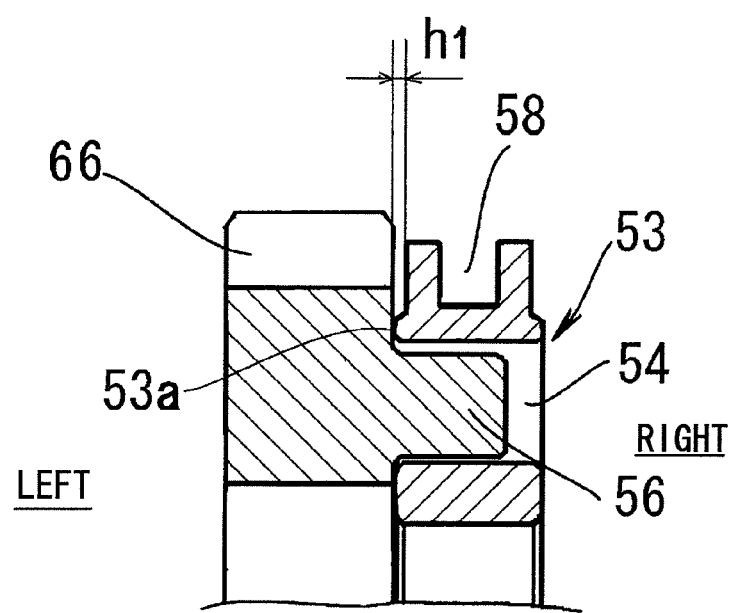
FIG. 6 is an enlarged sectional view of the engaged portion of the slider ring and the speed change output gear.

Effects of the Embodiment (1) FIG. 6 shows the state in which the third slider ring 53 is moved to the left side and the engaging hole 54 engages with the engaging projection 56 on the sixth-speed output gear 66. In the state of FIG. 6, the left projecting surface 53a of the third slider ring 53 is abutted onto the right end face of the sixth-speed output 66. With this, the over operation of the third slider ring 53 can be prevented, so that shoulder contact phenomenon (partial contact phenomenon) between the right end face of the sixth-speed output gear 66 and the third slider ring 53 can be prevented, and any noise can be prevented.

Needless to say, even at the time of changing to the first speed to the fifth speed, the stopper function of the projecting surfaces 51a, 52a and 53a of the slider rings 51, 52 and 53 can prevent the shoulder contact phenomenon of the gear and any noise.

(2) The length L3 (in FIG. 7) in the circumference direction of the engaging hole 54 in the third slider ring 53 is longer than the length L1 (FIG. 8) in the circumference direction of the engaging hole 54 in the first slider ring 51. With this configuration, when the engaging hole 54 in the third slider ring 53 shown in FIG. 7 engages with the engaging projection 56 on the sixth-speed output gear side 66 (not shown) for changing to the sixth speed, even the sixth-speed output gear 66 rotated at high speed can make the engaging chance of the engaging projection 56 and the engaging hole 54 longer. With this, even at high speed rotation, the engaging projection 56 on the sixth-speed output gear 66 can immediately engage with the engaging hole 54 in the third slider ring 53, thereby enabling changing to the sixth-speed state.

In addition, as in the sixth speed, the third slider ring 53 is used at the time of changing to the fifth speed, so that the engaging chance can be longer and the engaging projection 56 on the fifth-speed gear 65 rotated at high speed can immediately engage with the engaging hole 54 in the third slider ring 53, thereby enabling changing to the fifth-speed state.

(3) In FIG. 8, when the engaging hole 54 in the first slider ring 51 engages with the engaging projection 56 on the first-speed output gear 61 (not shown) for changing to the first speed, the first-speed output gear 61 is rotated at the lowest speed, so that even when the length L1 in the circumferential direction of the engaging hole 54 in the first slider ring 51 is short, the engaging chance can be sufficiently ensured. In addition, at the time of engagement, the amount of movement of the engaging projection 56 in the engaging hole 54 is small, so that in the case of the first-speed output gear 61 to which a large torque is applied, an impact force when the engaging projection 56 collides with the edge of the engaging hole 54 can be reduced, and any impact noise can also be prevented.

As in the first speed, at the time of changing to the second speed, even when the length L1 in the circumference direction of the engaging hole 54 in the first slider ring 51 is short, the engaging chance can be sufficiently ensured. In addition, at the time of engagement, the amount of movement of the engaging projection 56 in the engaging hole 54 is small, so that in the case of the second-speed gear 62 to which a large torque is applied, an impact force when the engaging projection 56 collides with the edge of the engaging hole 54 can be reduced, and any impact noise can also be prevented.

(4) In FIGS. 7 and 8, in the state that the engaging projection 56 and the engaging hole 54 are engaged, the power is transmitted to the output shaft 6 via the slide groove 78 on the inner circumference thereof, the sliding projection (spline projection) 81 and the intermediate cylindrical shaft 80. In this embodiment, the groove bottom 78a of the slide groove 78 is located outward in the radial direction from the inward end 54a of the engaging hole 54, so that the load applied from the engaging projection 56 to the slider rings 51 and 53 can be received, not only by a shearing force, but also by a compressive load which compresses the wall between the engaging holes 54 in the circumferential direction. Therefore, even when the wall thickness of the slider ring 53 is made smaller, sufficient load resistance strength can be held. In addition, the slider rings 51, 52 and 53 can be shortened in the radial direction, so that the slider rings can be reduced in size and weight.

(5) The output gears 61, 62, 63, 64, 65 and 66 and the input gears 41, 42, 43, 44, 45 and 46 are arranged so that the shifting stage is higher from one end toward the other end in the axial direction, that is, the diameter sequentially becomes larger or smaller. With this, the assembling order of the gears cannot be mistaken at the time of assembling, thereby improving the efficiency of the assembling operation. In addition, the speed change gears which are close in diameter are adjacent to each other to arrange each of the slider rings 51, 52 and 53 between the speed change gears which are close in diameter, so that the position in the radial direction of the engaging hole 54 of the slider rings 51, 52 and 53 and the position in the radial direction of the engaging projection 56 of both the speed change gears are easily matched to make the manufacturing easy.

Figure 14:
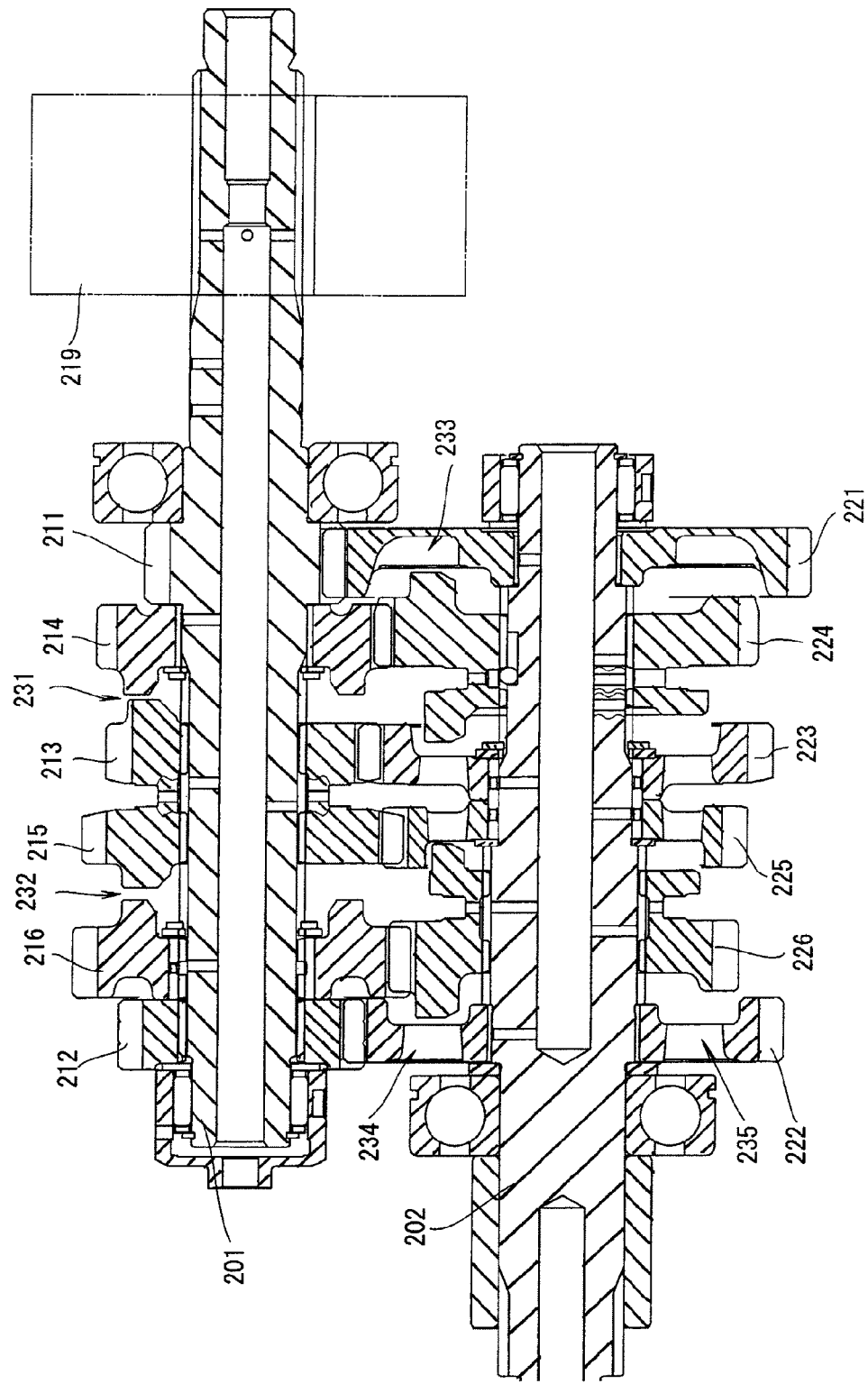
FIG. 14 is a cross-sectional view showing a conventional gear transmission for motorcycle.

(6) No gear teeth are formed on the slider rings 51, 52 and 53 which are moved in the axial direction, so that the slider rings 51, 52 and 53 can be reduced in outer diameter and weight, as compared with the conventional example of FIG. 14 in which the dog teeth are formed on the end faces of the speed change gears to slide the speed change gears themselves in the axial direction.

(7) The three slider rings 51, 52 and 53 for shift mechanism are all provided on the output shaft 6, so that the arrangement of the shift forks 81, 82 and 83, and the shift cam drum 75 are compactly arranged on one location, thereby simplifying the configuration.

(8) In the motorcycle, as compared with a four-wheel vehicle, to reduce the speed of the engine rotated at high speed, the shifting ratio between the speed change input gear and the speed change output gear becomes larger, so that the diameter of the speed change output gear becomes larger. In such a transmission for a motorcycle, all the slider rings 51, 52 and 53 are arranged on the output shaft 6, so that the forming process of the engaging projection 56 which can engage with the engaging hole 54 of the slider rings 51, 52 and 53 is advantageous in strength or processing as compared with when all the slider rings 51, 52 and 53 are formed on the speed change input gears having a small diameter.

(9) The input gears 41, 42, 43, 44, 45 and 46, and the output gears 61, 62, 63, 64, 65 and 66 are not moved in the axial directions. Therefore, even when the shifting operation is performed, the speed change gears themselves cannot incline, and the contacting of the gear teeth ends is maintained good, there being no fear of causing pitting.

(10) Since all the speed change input gears 41, 42, 43, 44, 45 and 46 and the speed change output gears 61, 62, 63, 64, 65 and 66 are fixed in the axial direction not to be moved in the axial direction, the shaft length of the input shaft 5 and the output shaft 6 can be held short; so that the shaft diameter and the weight thereof can be smaller. In addition, shaft bending due to the load during the driving can be reduced, thereby making the shift feeling smooth.

(11) The engaging holes 54 are formed in the slider rings 51, 52 and 53, and the engaging projections 56 which engage with the engaging holes 54 are formed on the speed change gear, so that at the time of engagement, the slider rings 51, 52 and 53 can receive a driving load, not only by a shearing force, but also a compressive force in the circumference direction. With this, the thickness of the slider rings 51, 52 and 53 can be smaller, thereby capable of holding the length in the axial direction of the input shaft 5 and the output shaft 6 short.

(12) The shift cam drum 75 and the shift shaft 85 are arranged below the output shaft 6 and the input shaft 5, so that the lubricating oil which lubricates the gear fitted portions of the output shaft 6 and the input shaft 5 is dropped onto the shift forks 81, 82 and 83, and the shift cam drum 75 therebelow, and is automatically used for lubricating the shift forks 81, 82 and 83, and the shift cam drum 75.

(13) The nitrided layer is formed on the surface of the slider rings 51, 52 and 53, so that the durability with respect to an impact can be improved, as compared with a carburizing process in which the hardness is increased to the inside thereof.

(14) The three shift forks 81, 82 and 83 in the same shape are used, so that the productivity of the shift forks 81, 82 and 83 can be improved to make the parts management easy.

Second Embodiment

Figure 11:
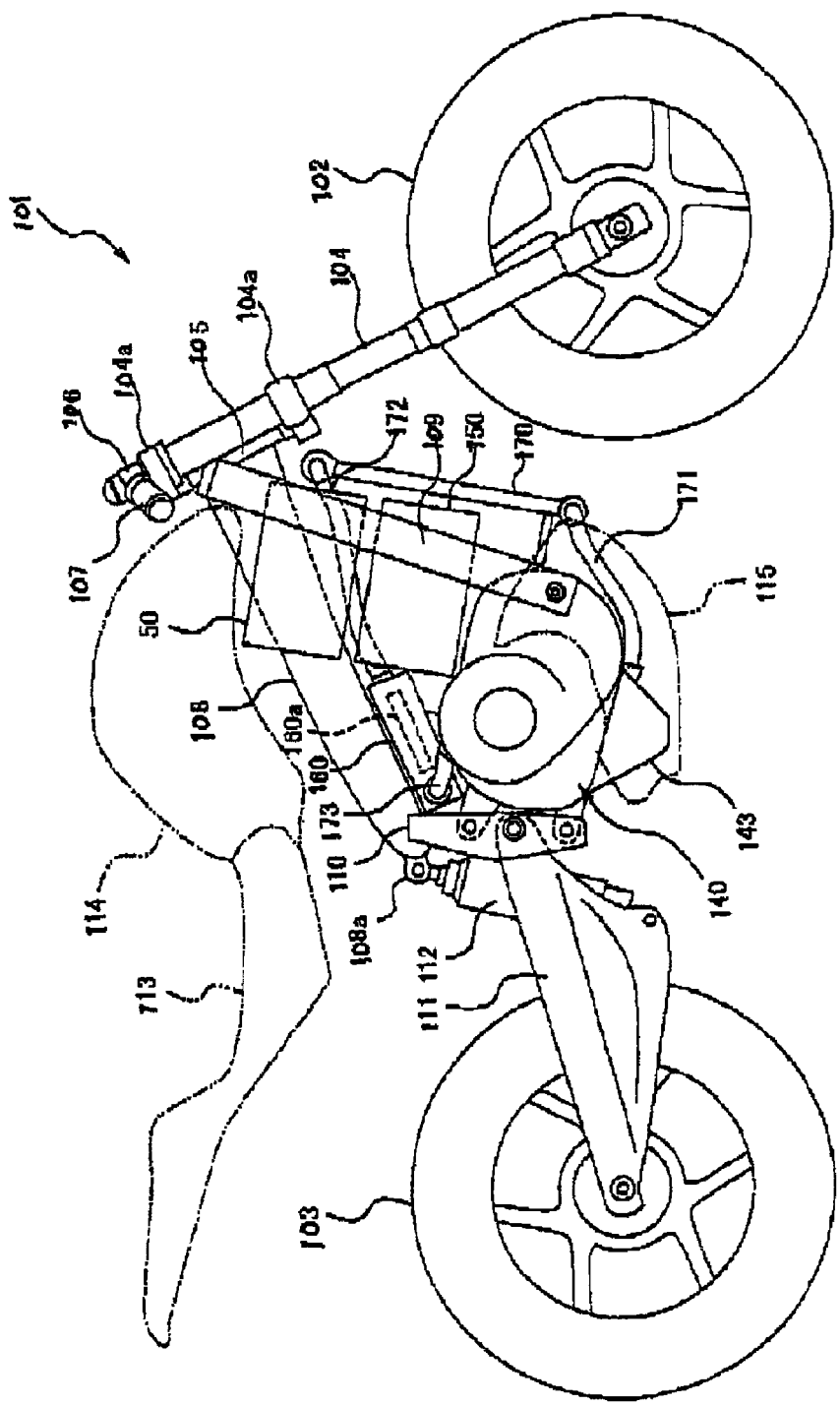
FIG. 11 is a right side view of an electrically-powered motorcycle according to a second embodiment of the present invention.
Figure 12:
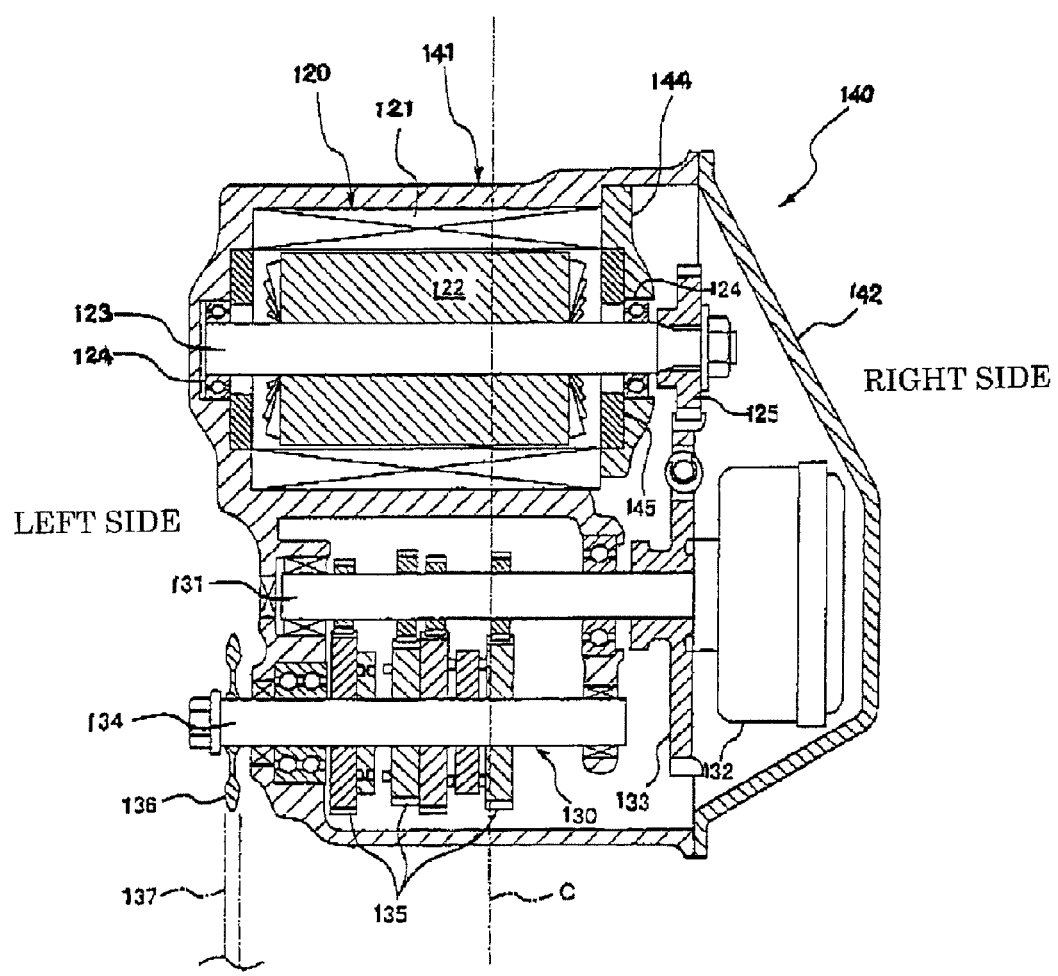
FIG. 12 is a developed view showing the configuration of a power plant of the electrically-powered motorcycle.
Figure 13:
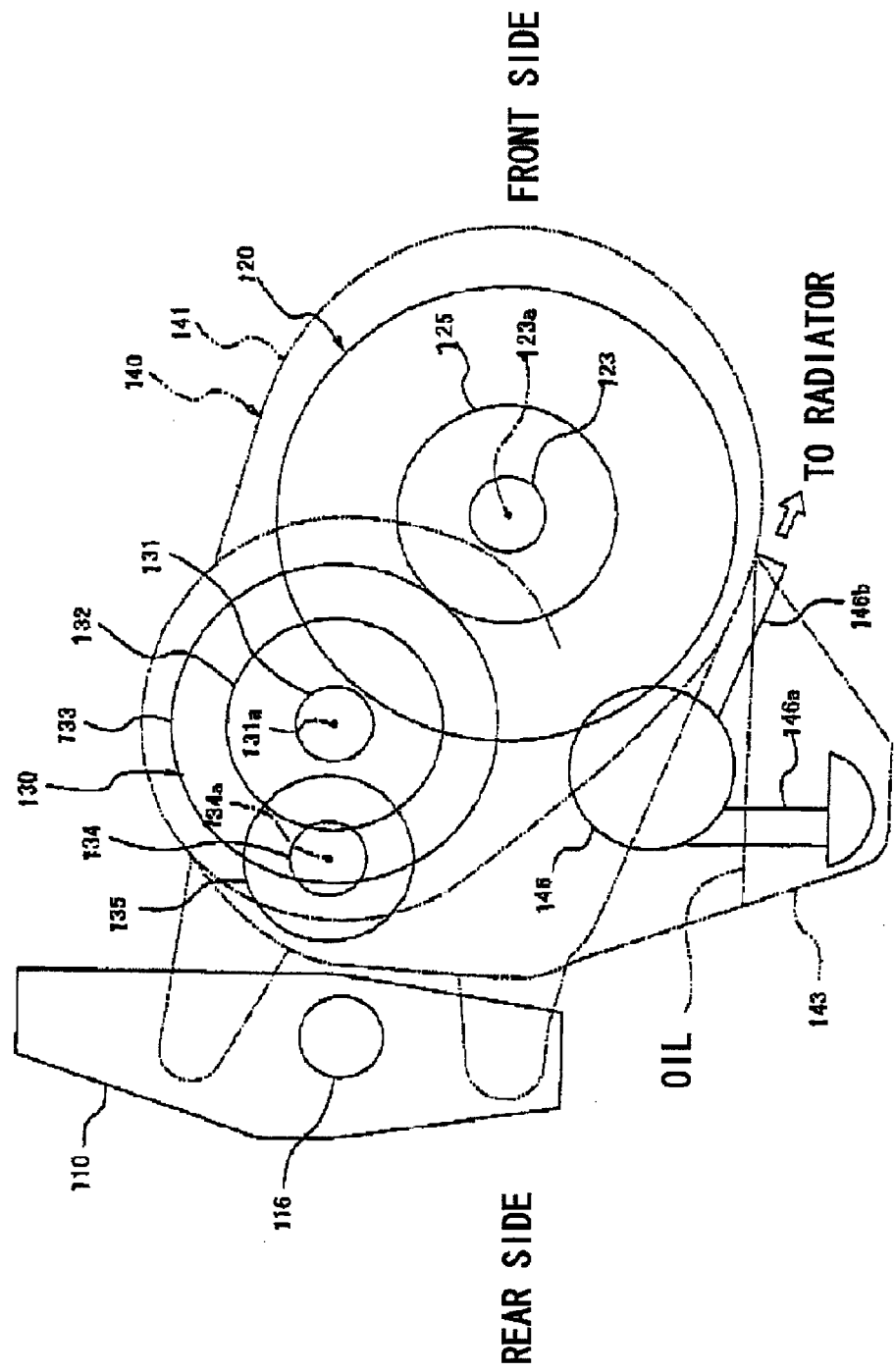
FIG. 13 is an explanatory view showing the layout of main components in the power plant seen from the side.

FIGS. 11 to 13 show a second embodiment of the present invention. FIG. 11 is a right side view showing a body frame, a power plant and main vehicle portions of an electrically-powered motorcycle 101 according to the second embodiment. As shown in FIG. 11, the electrically-powered motorcycle 101 has a front wheel 102 which is a steering wheel and a rear wheel 103 which is a driving wheel. The front wheel 102 is rotatably supported at the lower ends of a pair of left and right front forks 104 which extend substantially vertically. On the other hand, the upper portions of the front forks 104 are supported by a steering shaft (not shown) via a pair of upper and lower brackets 104a.

The steering shaft is rotatably supported so as to be inserted into a head pipe 105 on the vehicle body and forms a shaft for steering. In other words, a handle bar 106 which extends in the left-right direction is attached to the upper bracket 104a. The driver can steer the front forks 104 and the front wheel 102 about the steering shaft by the handle bar 106. An accelerator grip 107 is disposed at the right end of the handle bar 106 so as to be held by the right hand of the driver and to be rotated by twisting his/her wrist.

As an example, the vehicle body frame of the electrically-powered motorcycle 101 has a main frame 108 which extends rearwardly from the head pipe 105 so as to incline slightly downward. The main frame 108 is made of e.g., a pipe material having a square section which is an extrusion mold of an aluminum alloy, the front end thereof being welded to the head pipe 105. Near the welded portion, the upper ends of a pair of left and right down frames 109 which extend downward are welded. These down frames 109 extend downward from the head pipe 105 so as to be spread in the left-right direction to an interval having a predetermined value, and then extend downward by holding the interval.

On the other hand, at the rear end of the main frame 108, the upper frame portion of a pivot frame 110 having a rectangular frame shape (the pivot supporting portion of the vehicle body frame) is welded so as to be substantially orthogonal to the rear end of the main frame 108 and to extend in the left-right direction. The rear portion of the case of a power plant 140 which will be described later in detail is fastened to the pivot frame 110. The front portion of the case is fastened to the lower ends of the down frames 109. In other words, the vehicle body frame of this embodiment is integrally formed by the main frame 108, the down frame 109, the pivot frame 110 and the case of the power plant 140, thereby ensuring high twist rigidity.

Between the left frame portion and the right frame portion of the pivot frame 110, the front end of a swing arm 111 which supports the rear wheel 103 is supported to be swingable up and down. The swing arm 111 extends rearwardly from a swing support shaft 116 (pivot shaft) so as to incline slightly downward. In the example of the drawing, the swing arm 111 is branched into two on the rear side thereof, thereby rotatably supporting the rear wheel 103 between the branched portions. On the other hand, a portion which is swollen downward is formed on the front side of the swing arm 111, and supports the lower end of a suspension unit 112. The upper end of the suspension unit 112 is supported by a projecting portion 108a at the rear end of the main frame 108. The suspension unit 112 is expanded and contracted with the up-and-down swing of the swing arm 111.

Further, in the drawing, as indicated by the imaginary line, a straddling seat 113 is disposed above the swing arm 111, and tandem grips 113a are provided along the left and right side edges of the straddling seat 113. The tandem grips 113a are gripped by the rider who straddles the rear portion of the seat. The straddling seat 113 is supported by a rear frame (not shown) connected to the main frame 108. In addition, a dummy tank 114 is provided in front of the seat 113, so that the driver can interpose the dummy tank 114 between his/her knees. Further, a resin under guard 115 is disposed below the power plant 140.

In the motorcycle which is driven by an engine (driven by an internal combustion engine), an engine, a transmission and a throttle device are arranged in a space between the front wheel 102 and the rear wheel 103. On the contrary, in the electrically-powered motorcycle, the power plant 140 having a driving motor 120 and a transmission 130 (see FIG. 12), a battery 150 (battery device) for supplying electric power to the driving motor 120 and an electric power control unit 160 are disposed in a space between the front wheel 102 and the rear wheel 103. The driving motor 120 is a motor generator which enables a motor operation and an electric power generation operation. The driving motor 120 motor-drives the rear wheel 103 by electric power supplied from the battery 150 via the electric power control unit 160. On the other hand, at the time of the regenerative control of the electrically-powered motorcycle, the driving motor 120 is operated as an electric power generator. An alternating current generated by the driving motor 120 is converted to a direct current by the inverter of the electric power control unit 160 to charge the battery 150. As is well known, control according to the operation of the driving motor 120 and the charging control of the battery 150 are performed according to the operation of the accelerator grip and the driving state of the motorcycle 101.

In the example of the drawing, the power plant 140 is located at substantially the center between the front wheel 102 and the rear wheel 103, so that four batteries 150 are mounted from the upper side to the front side thereof. As an example, the four batteries 150 are divided in the left-right direction with respect to the main frame 108 so that the two batteries 150 are arranged on the left side and the two batteries 150 are arranged on the right side. Of the four batteries 150, each of the two lower batteries 150 (that is, each of the two batteries closer to the power plant 140) has a lower end which is located forward of an output shaft 134 (output shaft indicated by the dashed line in FIG. 11) of the power plant 140, and is close to the upper side of the power plant 140.

FIG. 12 shows the inner configuration of the power plant 140. In this example, the case of the power plant 140 includes a bottomed cylindrical body having a substantially elliptical shape in side view. The case has an outer case 141 and a cap 142. The bottom portion of the outer case 141 is directed to the left side. The cap 142 is fastened to an opening on the right side of the outer case 141 to close the opening of the outer case 141. As shown in FIG. 11, an oil pan 143 which is narrowed towards the lower side thereof and is swollen out downward is provided at the lower end of the outer case 141. An oil pump 146 is accommodated in the oil pan 143 (see FIG. 13).

The driving motor 120 has a stator 121 which is fixed to the outer case 141, and a rotor 122 which is rotated with respect to the stator 121. In this example, the driving motor 120 includes a so called IMP motor in which a permanent magnet is buried in the iron core of the rotor 122. Although not shown in detail, the stator 121 has a typical configuration in which a plurality of electromagnetic coils is wound around the iron core (stator core) including an electromagnetic steel plate. The stator 121 is arranged so as to surround the outer circumference of the rotor 122, and has an outer circumference fixed to the outer case 141.

On the other hand, a motor shaft 123 (a shaft of the motor) made of steel passes through the rotor 122. Both ends in the axial (longitudinal) direction of the motor shaft 123 are supported in the outer case 141 by ball bearings 124, respectively. The ball bearing 124 on the left side is fitted into a circular recess 141a of the bottom of the outer case 141. The ball bearing 124 on the right side is disposed in a separate partition wall portion 144 fastened to the outer case 141. The motor shaft 123 passes through the partition wall portion 144 and projects to the right side, so that an output gear 125 is disposed at the end of the motor shaft 123.

A clutch shaft 131 which is the input shaft of the transmission 130 is disposed on the rear side of the driving motor 120. A multiple-disc clutch 132 disposed on the right side of the clutch shaft 131 switches the rotation output from the driving motor 120 between connection and disconnection. In other words, a clutch gear 133 is rotatably fitted on the right end of the clutch shaft 131. When the clutch gear 133 is connected to the clutch shaft 131 by the multiple-disc clutch 132, the clutch shaft 131 is interlocked with the motor shaft 123 for rotation.

In addition, the output shaft 134 of the transmission 130 is disposed in parallel with the clutch shaft 131, and is connected via a gear group 135 for shifting. The combination of the gears connected in the gear group 135 is changed to change the shifting ratio of the input/output rotation, that is, the shifting stage of the transmission 130. A sprocket 136 is provided at the left end of the output shaft 134 which outputs speed-changed rotation. A chain 137 (endless electrically-powered member indicated by the imaginary line) is wound between the sprocket 136 and the sprocket of the rear wheel 103.

The gear transmission of the second embodiment has four speeds. The gear group 135 having four gears and two slider rings 150 is arranged on the output shaft (a shaft for outputting) 134. The second embodiment has the same feature as the first embodiment. Further, in FIG. 12, the shift cam drum and the shift forks are omitted.

As in the second embodiment, the electrically-powered motorcycle having an electric motor in place of an engine (internal combustion engine) can prevent the transmission from being larger in the vehicle width direction and can be compact.

Figure 9:
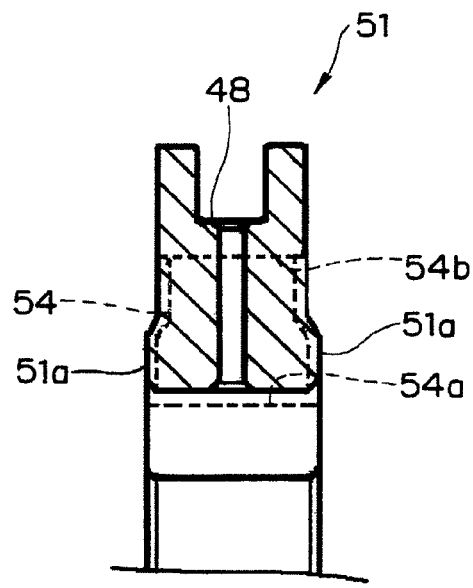
FIG. 9 is an enlarged sectional partial view showing a modification example of the slider ring.

Other Embodiments (1) FIG. 9 is a modification example of the slider ring 51 (and 52, 53), in which the position of the outward end in the radial direction of the projecting surface 51a formed on the end face thereof in the axial direction is set to the intermediate position of the width in the radial direction of the engaging hole 54.

Figure 10:
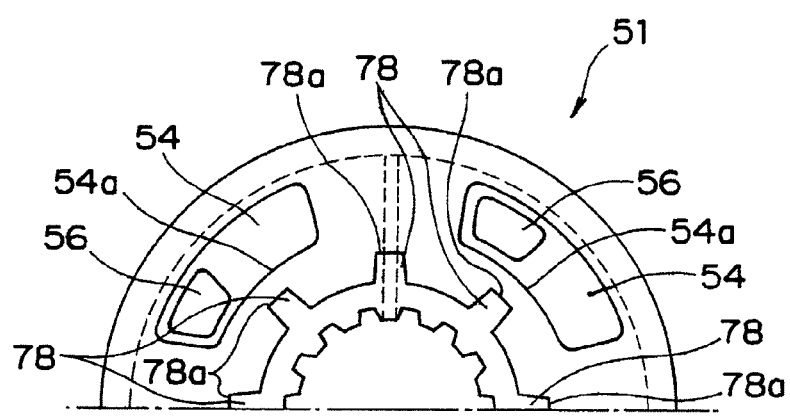
FIG. 10 is an enlarged sectional partial view showing another modification example of the slider ring.

(2) FIG. 10 is another modification example of the slider ring 51 (and 52, 53), in which the groove bottom 78a of the slide groove 78 formed in the inner circumferential surface thereof in the radial direction is formed to be located inward in the radial direction from the inward end 54a of the engaging hole 54 and about 10 to 12 slide grooves 78 are formed with spacing in the circumference direction.

(3) In the embodiment shown in FIG. 2, the shift cam drum 75 and the shift forks 81, 82 and 83 are arranged below the output shaft 6 and the input shaft 5. However, the shift cam drum 75 and the shift forks 81, 82 and 83 may also be arranged above the output shaft 6 and the input shaft 5. In this case, the lubricating oil used in the shift cam drum 75 and the shift forks 81, 82 and 83 is automatically used as the lubricating oil of the output shaft 6 and the input shaft 5 therebelow.

(4) In the embodiment shown in FIGS. 1 and 2, all the slider rings 51, 52 and 53 are provided on the output shaft 6. However, all the slider rings 51, 52, and 53 may also be provided on the input shaft 5 in the present invention.

(5) The present invention is applicable to 4-speed, 5-speed, 7-speed or more transmissions.

(6) The speed change output gears and the slider rings 51, 52 and 53 on the output shaft 6 shown in FIG. 2 are provided on the intermediate cylindrical shaft 80 fixed to the output shaft 6. However, the slider rings 51, 52 and 53 may also be directly provided on the output shaft 6 in the present invention.

(7) In the present invention, various changes and modifications can be made without departing from the spirit and scope of the present invention described in the claims.

EXPLANATION OF REFERENCE NUMERALS

3 Crankshaft
5 Input shaft
6 Output shaft
21 Crank gear
28 Clutch gear
35 Multiple-disc friction clutch
41, 42, 43, 44, 45, 46 First-speed to sixth-speed input gears (speed change gears)
51, 52, 53 First, second, and third slider rings
51a, 52a, 53a Projecting surface
54 Engaging hole
54a Inward end
54b Outward end
56 Engaging projection
61, 62, 63, 64, 65, 66 First-speed to sixth-speed output gears (speed change gears)
71, 72, 73 Cam groove
75 Shift cam drum
78 Slide groove
78a Groove bottom (outward end)
81, 82, 83 Shift fork
120 Driving motor (electric motor)
130 Gear transmission
131 (Clutch shaft) Input shaft

The invention claimed is:
1. A transmission for a motorcycle, comprising:
an input shaft;
an output shaft arranged in parallel with the input shaft;
a plurality of speed change input gears on the input shaft; and
a plurality of speed change output gears on the output shaft, the speed change output gears engaging with the speed change input gears, respectively, for allowing selection of a power transmission path via the speed change input gears and the speed change output gears between the input shaft and the output shaft for shifting;
wherein all of the speed change input gears on the input shaft are fixed to the input shaft so as not to be movable in an axial direction of the input shaft;
wherein all of the speed change output gears on the output shaft are fixed to the output shaft so as not to be movable in an axial direction of the output shaft;
wherein a plurality of slider rings for dog-coupling are fixed to the output shaft about the axis of the output shaft and are slidable in the axial direction of the output shaft; and
wherein engaging holes are formed in each of the slider rings, and each of the speed change output gears on the output shaft has engaging projections for engaging the engaging holes by a movement of the slider rings in the axial direction of the output shaft.

2. The transmission for a motorcycle according to claim 1, wherein the plurality of speed change input gears and the plurality of speed change output gears are arranged so that shifting stages are sequentially higher from a first end toward a second end opposite the first end in the axial direction of the input shaft and the output shaft.

3. The transmission for a motorcycle according to claim 1, wherein a nitrided layer is formed on a surface of each of the slider rings.

4. The transmission for a motorcycle according to claim 1, wherein each of the slider rings is coupled to a shift cam drum so as to be moved in the axial direction of the output shaft via a shifter member;
wherein the shift cam drum is arranged below the output shaft so that a lubricating oil dropping from the output shaft is supplied to the shift cam drum.

5. The transmission for a motorcycle according to claim 1, wherein each of the slider rings is coupled to a shift cam drum so as to be moved in the axial direction of the output shaft via a shifter member;
wherein the shift cam drum is arranged above the output shaft so that a lubricating oil dropping from the shift cam drum is supplied to the speed change output gear on the output shaft.

6. The transmission for a motorcycle according to claim 4, wherein the shifter member is one of three shifter members, the three shifter members having the same shape.

7. A transmission for an electrically-powered motorcycle comprising an electric motor in the transmission for motorcycle according to claim 1, wherein power from the electric motor is inputted to the input shaft.

8. The transmission for a motorcycle according to claim 1, wherein all of the speed change input gears are fixed to the input shaft so as not to be rotatable about an axis of the input shaft; and
wherein all of the speed change output gears are fitted to the output shaft so as to be rotatable about the axis of the output shaft.

9. The transmission for a motorcycle according to claim 1, wherein no gear teeth are formed on an outer peripheral surface of any of the slider rings.

10. The transmission for a motorcycle according to claim 1, wherein the slider rings are fixed only to the output shaft.

11. The transmission for a motorcycle according to claim 1, wherein the engaging holes of the slider rings extend through the slider rings in a thickness direction of the slider rings.

12. The transmission for a motorcycle according to claim 1, wherein the slider rings are coupled to a shift cam drum so as to be moved in an axial direction of the output shaft via shifter members; and wherein the shift cam drum is arranged above or below the output shaft so that a lubricating oil dropped from a first one of the shift cam drum and the output shaft is supplied to a second one of the shift cam drum and the output shaft.

13. The transmission for a motorcycle according to claim 1, wherein a lubricating oil for lubricating gear fitted portions is dropped so as to be supplied onto lubricating portions of a shift cam drum and the slider rings.

14. The transmission for a motorcycle according to claim 1, wherein a shift cam drum and a shift shaft located under the input shaft and the output shaft.

15. The transmission for a motorcycle according to claim 2, wherein the speed change input gears and the speed change output gears for a high speed stage are located at a clutch side in the axial direction of the input shaft and the output shaft, and the speed change input gears and the speed change output gears for a low speed stage are located at an output end side in the axial direction of the input shaft and the output shaft.

16. A transmission for a motorcycle, comprising:
an input shaft;
an output shaft arranged in parallel with the input shaft;
a plurality of speed change input gears on the input shaft; and
a plurality of speed change output gears on the output shaft, the speed change output gears engaging with the speed change input gears, respectively, for allowing selection of a power transmission path via the speed change input gears and the speed change output gears between the input shaft and the output shaft for shifting;
wherein the plurality of speed change input gears are fixed to the input shaft in an axial direction of the input shaft and about an axis of the input shaft;
wherein the plurality of speed change output gears are fixed to the output shaft in an axial direction of the output shaft and are fitted to be rotatable about an axis of the output shaft;
wherein a plurality of slider rings for dog-coupling are fixed to the output shaft about the axis of the output shaft and are slidable in the axial direction of the output shaft;
wherein engaging holes are formed in each of the slider rings, and each of the speed change output gears on the output shaft has engaging projections for engaging the engaging holes by a movement of the slider rings in the axial direction of the output shaft;
wherein a plurality of slide grooves extending in the axial direction are formed in an inner circumferential surface of each of the slider ring;
wherein a sliding projection engages with a respective one of the slide grooves in a respective one of the slider rings is formed on the output shaft or a cylindrical member fixed to the output shaft; and
wherein the slide grooves are arranged in positions displaced from the engaging holes in the circumferential direction, and an outward end in the radial direction of each of the slide grooves projects outward in the radial direction from an inward end in the radial direction of a respective one of the engaging holes.

17. A transmission for a motorcycle, comprising:
an input shaft;
an output shaft arranged in parallel with the input shaft;
a plurality of speed change input gears on the input shaft; and
a plurality of speed change output gears on the output shaft, the speed change output gears engaging with the speed change input gears, respectively, for allowing selection of a power transmission path via the speed change input gears and the speed change output gears between the input shaft and the output shaft for shifting;
wherein the plurality of speed change input gears are fixed to the input shaft in an axial direction of the input shaft and about an axis of the input shaft;
wherein the plurality of speed change output gears are fixed to the output shaft in an axial direction of the output shaft and are fitted to be rotatable about an axis of the output shaft;
wherein a plurality of slider rings for dog-coupling are fixed to the output shaft about the axis of the output shaft and are slidable in the axial direction of the output shaft; and
wherein engaging holes are formed in each of the slider rings, and each of the speed change output gears on the output shaft has engaging projections for engaging the engaging holes by a movement of the slider rings in the axial direction of the output shaft; and
wherein at least a length in the circumferential direction of the engaging holes in the one of the slider rings for a lowest speed stage is shorter than a length in the circumferential direction of the engaging holes in the one of the slider rings for a highest speed stage.

18. The transmission for a motorcycle according to claim 17, wherein the input shaft and the output shaft are parallel to a crank shaft of a multi-cylinder engine.

19. The transmission for a motorcycle according to claim 17, wherein an engaging change of a respective one of the engaging holes and a respective one of the engaging projections becomes longer in a high speed stage and becomes shorter in a low speed stage.

20. A transmission for a motorcycle, comprising:
an input shaft;
an output shaft arranged in parallel with the input shaft;
a plurality of speed change input gears on the input shaft; and
a plurality of speed change output gears on the output shaft, the speed change output gears engaging with the speed change input gears, respectively, for allowing selection of a power transmission path via the speed change input gears and the speed change output gears between the input shaft and the output shaft for shifting;
wherein the plurality of speed change input gears are fixed to the input shaft in an axial direction of the input shaft and about an axis of the input shaft;
wherein the plurality of speed change output gears are fixed to the output shaft in an axial direction of the output shaft and are fitted to be rotatable about an axis of the output shaft;
wherein a plurality of slider rings for dog-coupling are fixed to the output shaft about the axis of the output shaft and are slidable in the axial direction of the output shaft; and
wherein engaging holes are formed in each of the slider rings, and each of the speed change output gears on the output shaft has engaging projections for engaging the engaging holes by a movement of the slider rings in the axial direction of the output shaft; and
wherein an end face in an axial direction of each of the slider rings has a projecting surface forming a stopper projecting stepwise in the axial direction of each of the slider rings in a range from near an inward end in the radial direction of a respective one of the engaging holes to near an outward end in the radial direction of a respective one of the engaging holes.

* * * * *